United States Patent
Brady, Jr.

(10) Patent No.: US 10,045,650 B2
(45) Date of Patent: Aug. 14, 2018

(54) DC RECHARGEABLE BATTERY POWERED APPLIANCE PURPOSED TO REMOVE A THIN OUTER LAYER OF SKIN FROM VEGETABLES AND FRUITS

(71) Applicant: Frederic William Brady, Jr., Las Vegas, NV (US)

(72) Inventor: Frederic William Brady, Jr., Las Vegas, NV (US)

( * ) Notice: Subject to any disclaimer, the term of this patent is extended or adjusted under 35 U.S.C. 154(b) by 0 days.

(21) Appl. No.: 15/620,022

(22) Filed: Jun. 12, 2017

(65) Prior Publication Data
US 2018/0184834 A1 Jul. 5, 2018

Related U.S. Application Data

(60) Provisional application No. 62/441,176, filed on Dec. 31, 2016.

(51) Int. Cl.
*A47J 17/02* (2006.01)
*A47J 17/18* (2006.01)
*H01M 10/0525* (2010.01)

(52) U.S. Cl.
CPC .............. *A47J 17/18* (2013.01); *A47J 17/02* (2013.01); *H01M 10/0525* (2013.01); *H01M 2220/30* (2013.01)

(58) Field of Classification Search
CPC ............ A47J 17/02; A47J 17/14; A47J 17/18
USPC .................. 30/279.6, 123.5; 99/588, 584
See application file for complete search history.

(56) References Cited

U.S. PATENT DOCUMENTS

| 3,921,287 | A | * | 11/1975 | Gomez | .............. | A47J 17/00 30/123.5 |
|---|---|---|---|---|---|---|
| 4,073,056 | A | | 2/1978 | Schaeffer et al. | | |
| 4,128,939 | A | | 12/1978 | Schaeffer | | |
| 4,157,062 | A | * | 6/1979 | Ackeret | .............. | A47J 19/02 100/112 |
| 4,211,002 | A | | 7/1980 | Kirk | | |
| 4,656,936 | A | | 4/1987 | Bardon | | |
| 4,765,234 | A | | 8/1988 | Cailliot | | |
| 4,771,682 | A | | 9/1988 | Ishikawa | | |
| 4,972,769 | A | * | 11/1990 | Cailliot | .............. | A47J 17/14 30/276 |

(Continued)

OTHER PUBLICATIONS

Mystery Lithium Rechargeable Battery Advertisement, From http://www.dx.com/p/mystery-7-4v-900mah-15c-lithium-polymer-rechargeable-battery-for-r-c-helicopters-7621#.Wi6S0k3rudl.*

*Primary Examiner* — Dana Ross
*Assistant Examiner* — Lawrence Samuels
(74) *Attorney, Agent, or Firm* — Ming Chow; Sinorica, LLC

(57) ABSTRACT

A dc rechargeable, battery powered, food preparation device uses rapid angular displacement action thereby enabling a human operator to use barely more than the weight of the instrument's spinning cutter against a wide variety of fruit and vegetable peels ranging from dense eggplant to delicate peach, while also providing for operator safety through the use of safe-start interlock technology along with a catch-and-release safety cover over the cutting head itself. As a result the user friendly appliance scales the entire surface of common produce items while rapidly and efficiently removing the outer layer of skin in bitwise fashion as opposed to generating continuous long strings of discard material.

5 Claims, 6 Drawing Sheets

Front View      Side View

(56) References Cited

U.S. PATENT DOCUMENTS

| | | | | |
|---|---|---|---|---|
| 5,279,035 A * | 1/1994 | Cohen | A47J 17/02 | 30/294 |
| 5,845,565 A * | 12/1998 | McNair-Chaplin | A47J 17/14 | 30/123.5 |
| 5,865,110 A * | 2/1999 | Yonezawa | A47J 17/02 | 30/123.5 |
| 6,082,253 A * | 7/2000 | Ridler | A47J 17/10 | 99/594 |
| 6,186,058 B1 * | 2/2001 | Ehrig, Jr. | A23N 7/023 | 451/178 |
| 6,444,954 B1 * | 9/2002 | Blankenship | A47J 37/0635 | 219/386 |
| 7,185,436 B2 * | 3/2007 | Murphy | A47J 17/02 | 30/123.6 |
| 2004/0128841 A1 * | 7/2004 | Prommel | A47J 17/02 | 30/286 |
| 2005/0028384 A1 * | 2/2005 | Hughes | A47J 17/02 | 30/279.6 |
| 2005/0262703 A1 * | 12/2005 | Best | A47J 17/02 | 30/279.6 |
| 2005/0278957 A1 * | 12/2005 | McCullough | B26B 27/002 | 30/279.6 |
| 2007/0227013 A1 * | 10/2007 | Kaposi | A47J 17/02 | 30/279.6 |
| 2008/0282910 A1 * | 11/2008 | Morgan | A23N 7/026 | 99/590 |
| 2010/0064524 A1 * | 3/2010 | Mah | A47J 17/02 | 30/123.5 |
| 2010/0162906 A1 * | 7/2010 | Scimone | A47J 17/02 | 99/541 |
| 2012/0085249 A1 * | 4/2012 | Kuan | A47J 17/02 | 99/584 |
| 2012/0240792 A1 * | 9/2012 | Clarke | A23N 1/02 | 99/509 |

* cited by examiner

Front View       Side View

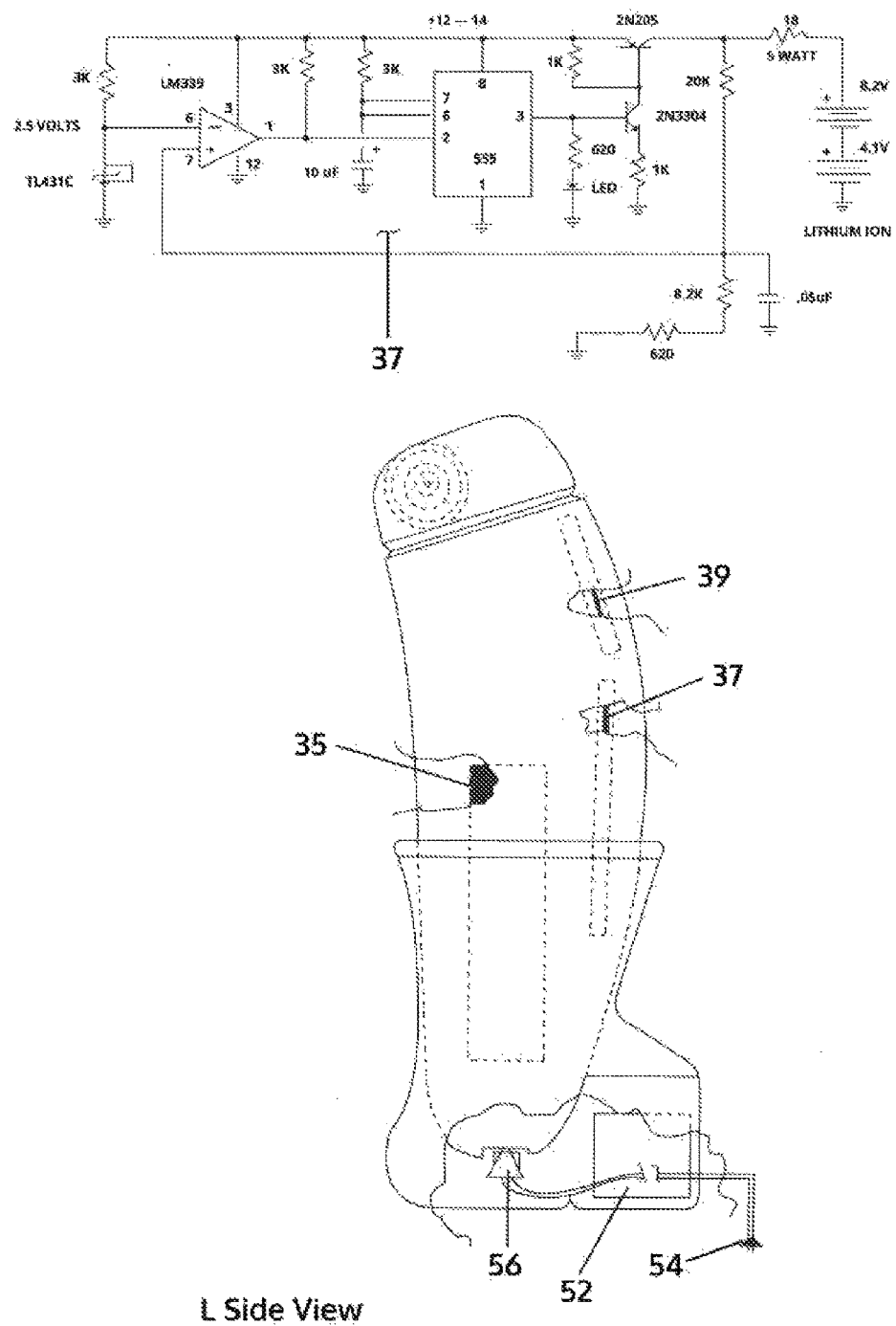
L Side View
Fig 3.1

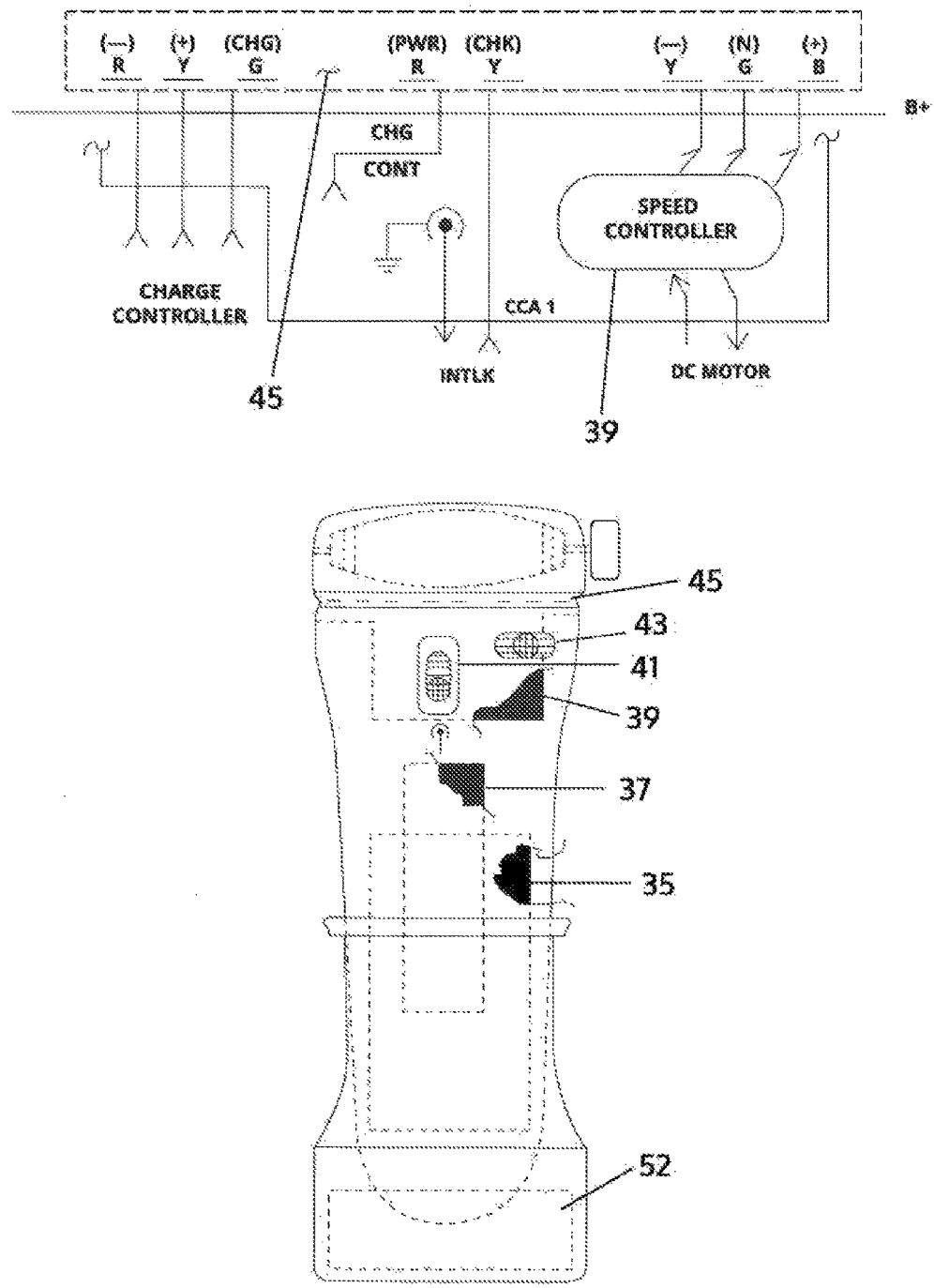
Rear View
Fig 3.2

DC RECHARGEABLE BATTERY POWERED APPLIANCE PURPOSED TO REMOVE A THIN OUTER LAYER OF SKIN FROM VEGETABLES AND FRUITS

CROSS-REFERENCE TO RELATED APPLICATIONS

This application claims the benefit of provisional patent application Ser. No. 62/441,176, filed 2016 Dec. 31 by the present inventor

BACKGROUND OF THE INVENTION

The present invention is in the technical field of food preparation devices. More particularly, the present invention is in the technical field of fruit and vegetable peeling and skin removal devices. More particularly, the present invention is in the technical field of increasing the speed, efficiency and portability of electrically assisted vegetable peeling and skin removal devices.

In the prior art there exists a number of attempts to remove a thin outer layer, which includes the skin, of ordinary produce items such as potatoes, carrots, zucchini, apples and oranges, and in particular there is demonstrated the slow and inefficient process of affixing the product to a continuously rotating pallet. Of the most prominent:

There exists the prior art practice of using a single stationary cutting device while maintaining the blade in a stationary position and setting the object being processed in motion, this as discarded waste material is removed in long and thin ribbons which have been known to become entangled in the machinery thus interrupting the process.

There exists still further in the prior art practice the necessity for setting and maintaining a slow and methodical pace for the operation mainly because of the small amount of material that can be cut away at any instantaneous moment and exacerbated further by the necessity to limit the rotational speed of the object being processed.

There exists still further the prior art practice of loading a quantity of objects to be processed into a spinning, shaking, oscillating tub the sides of which are lined with abrasive material. It is the intent to set the machine into a course of violent, shaking motion and thereby toss or jostle the processed objects against the abrading material until a layer of flesh including the outer skin has been removed. Such a process at the same time contributes to the unintended deleterious effect of removing an excessive amount of vegetable material and thereby causing undue waste of the otherwise edible food product.

There exists still further the prior art practice of using a multiplicity of sharp bladed instruments arranged around and embedded within a tubular support structure which is to be spun above and across all outer surfaces of the processed object (Schaffer et al) essentially abrading away layers of flesh including the outer layer of skin. Such a process at the same time contributes to the unintended deleterious effect of leaving behind a large quantity of very finely granulated waste material that without the advantage of flowing water to carry away the occluding waste also greatly reduces the efficacy of the device.

There exists still further the prior art practice of using several forged steel eyelet-type cutters arranged around and embedded within a tubular support structure which is to be spun above and across all outer surfaces of the processed object (Schaffer) and which is also claimed to have overcome the unintended deleterious effect so stated in the preceding paragraph. Lacking a guide surface for the waste and also a shield to trap the peelings contributes to a further deleterious and potentially hazardous effect of spewing the waste material in all directions.

There exists still further the prior art practice of using a water-driven motor element connected to a source of pressurized home tap water while using a drum to spin elongated and exposed blades attached to the drum. It is further expected that the fluid effluent may also flush discarded waste material from the drum. With the appliance being hand held, there exists the disadvantage of accidentally spewing the fluid effluent toward work areas that would not normally be expected to absorb water or otherwise be exposed to moisture.

There exists still further the prior art practice of using exposed and adjustable blades attached to once and variable types of rotating shafts designed to process large volumes of edible foodstuffs while resting on a table or other surface capable of sustaining substantial weights. For safe operation around most of these commercial appliances it is commonplace to assume that professional food preparation workers can be expected to observe safety procedures such as wearing gloves and other protective clothing while on the job. These are appliances that once put into place are neither lightweight, portable, nor are they often moved.

There exists still further the prior art practice of simultaneously rotating both the processed object and the cutting tool as a method for increasing the efficacy of skin removal on edible fruits that happen to be possessed of certain unique qualities. One such quality is described as a fruit or vegetable that has a soft inner layer between its skin and meaty flesh. It is felt that when a cutting tool is moved in the direction of its cutting edge as the workpiece is also in motion, that the pressure necessary to sustain high quality performance is lessened, a quality that tends to be of interest mainly to users of precision commercial equipment.

| U.S. Patent Documents | | |
| --- | --- | --- |
| 4,073,056 | Feb. 14, 1978 | Schaeffer et al |
| 4,128,939 | Dec. 12, 1978 | Schaeffer |
| 4,211,002 | Jul. 8, 1980 | Kirk |
| 4,656,936 | Apr. 14, 1987 | Bardon |
| 4,765,234 | Aug. 23, 1988 | Cailliot |
| 4,771,682 | Sep. 20, 1988 | Ishikawa |
| 4,972,769 | Nov. 27, 1990 | Cailliot |

SUMMARY OF THE INVENTION

The present invention employs a fruit and vegetable skin removal process that leverages efficiency upward by using a floating head cutting device contained within a broad roller assembly as installed in a hand held rechargeable dc appliance. It is this roller assembly that contacts the vegetable skin during processing and loses this contact only when the floating head cutting device arrives in position to make the cut, thereby making it possible to maintain a smooth, even cut while automatically gauging the depth into which the cut is made. Additionally, it is by continuously turning the object being processed with the fingers of one hand while guiding the floating head cutting device smoothly, evenly and safely over all surfaces of the object being processed that all surfaces can be processed to completion, including those areas of a fruit or vegetable that are beyond the reach of non-floating head, semi-automatic peeling devices with the possible exception of batch surface abrasion machines.

Furthermore, it is by eliminating the impactful and often painful process experienced by those afflicted with osteoarthritis while using forged steel peeling utensils that the lightweight and portable electric floating head peeling device is able to improve the quality of life for millions of seniors while augmenting a degree of comfort for disabled citizens in their homes. It is also by eliminating production of long strings of discard material during the cutting process in favor of removing the thin surface layer from the object being processed in a chip-wise fashion that the hand held and lightweight electric floating head peeling appliance may be used directly over the kitchen sink while allowing the peeling chips drop directly into the garbage disposer.

BRIEF DESCRIPTION OF THE DRAWINGS

FIG. 3.1 is a partial plan view of a hand held, battery powered fruit and vegetable peeling appliance of the present invention.

FIG. 3.2 is a partial plan view of a hand held, battery powered fruit and vegetable peeling appliance of the present invention.

DETAILED DESCRIPTION OF THE INVENTION

Figure 1:
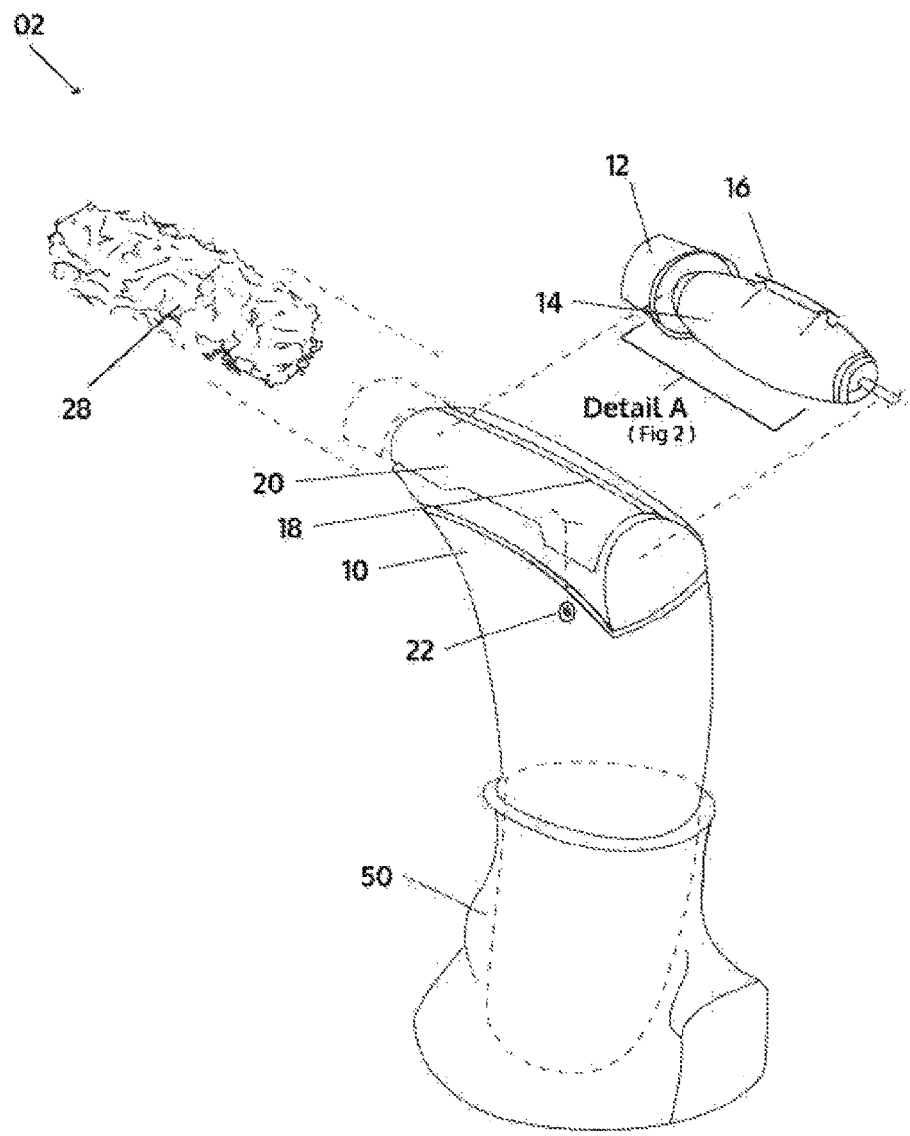
FIG. 1 is a partially exploded perspective view of a hand held, battery powered fruit and vegetable peeling appliance of the present invention.
Figure 2:
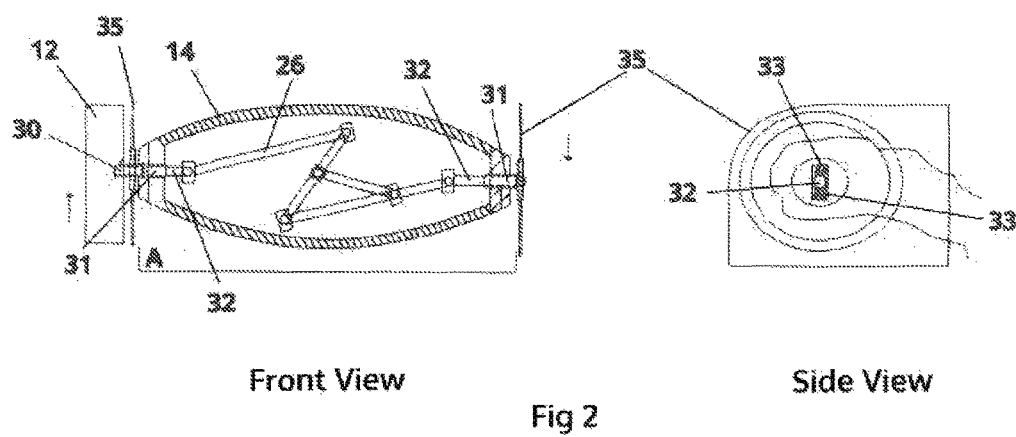
FIG. 2 is a sectioned view of a floating head roller subassembly as part of the present invention.

Referring to the invention in more detail, in FIG. 1 and FIG. 2 there is shown a dc rechargeable, battery powered fruit and vegetable peeling appliance 02 consisting of a hand held enclosure assembly 10 and a base unit charger assembly 50. In further discussing the hand held enclosure assembly 10, contained therein is an outboard linear dc electric motor 12, a revolving head roller assembly 14, a curvilinear cutting device 16, a miniature continuous poly-hinge 18, a spring loaded safety cover 20, a safety cover release mechanism 22, a roller assembly dust cover 28, a floating head roller subassembly Detail A, comprising a four-wire shaft assembly 26, a linear dc motor direct-drive output shaft 30, stationary four-wire shaft connector segments 32, free-wheeling sleeve bearings 31, spring cage assemblies 33 and sections of the enclosure side walls 35.

Referring now to the invention in still more detail, in FIG. 1 and FIG. 2 there is shown a floating head roller subassembly, Detail A, receiving angular displacement impetus from linear dc electric motor 12 while being connected to and embedded within revolving head roller assembly 14, thus imparting sustainable rotational force to the curvilinear cutting device 16. Stationary suspension of four-wire shaft assembly 26 is maintained through two stationary four-wire shaft connector segments 32 and a pair of sleeve bearings 31 being embedded within the fore and aft molded circular access holes, thereby allowing the revolving head roller assembly to progress through 360 degrees of revolution.

In referring to the invention in still further detail in FIG. 2, there are shown two spring cage assemblies 33 being implemented as inserts into slotted rectangular cutouts into the sidewalls of enclosure 35, the purpose being to assist the four-wire shaft assembly 26 in maintaining full floating head operation while revolving head roller assembly 14 is in contact with the workpiece, and also to support stationary four-wire shaft connector segment 32 as well as linear dc motor direct-drive output shaft 30 through the enclosure sidewalls 35.

In referring to the invention in still further detail in FIG. 2, it is to be seen and understood that with revolving head roller assembly 14 in constant contact with the workpiece, the springs within the spring cage assemblies 33 are compressed near the extreme top of their range. Irregularity in the workpiece, however, tends to cause a shift in the center of surface compression, thereby causing unevenness in spring compression from one side to the other. Arrows in the diagram illustrate the fact that greater surface compression on one side tends to cause a tilt in the horizontal plane of the revolving head roller assembly 14 due to an automatic elongation of four-wire shaft assembly 26 and thus movement of the opposite end of revolving head roller assembly 14 toward the pole of lesser spring compression.

Referring to the invention in more detail, with FIG. 1 in conjunction with FIG. 3.1 representing a partial plan view, to include circuit diagram 37, there is shown a hand-held enclosure assembly 10 and the base unit charger assembly 50 consisting of an ac adapter unit 52, an ac adapter cord with integrated plug 54, an ac adapter integrated socket 56 built into the base unit. Within the hand-held unit 10 there is also shown a 7.4V 900 mAh 15C LiPo rechargeable battery 35, a TL431 band gap voltage reference charge controller CCA 37, an LM741 op amp variable speed motor controller CCA 39, a flush mounted thumb-operated on-off switch 41, and a flush mounted thumb-operated speed control switch 43, a 9-element LED multi-colored instrument illumination strip 45.

In more detail, still referring to FIG. 1 and FIG. 3.1, the user would first prepare the dc rechargeable, battery powered fruit and vegetable peeling appliance 02 for operational use by removing the item from any and all packaging material and installing the unit on a flat and level surface near a convenient ac wall outlet. This would be done by fitting the hand held enclosure assembly 10 together with the base unit charger assembly 50 via the ac adapter unit 52, the ac adapter cord with integrated plug 54, and the ac adapter integrated socket 56. To accomplish this the user would utilize the integrated socket at the base of the hand held enclosure assembly 10 by gently rotating the enclosure assembly 10 until the guide pins come into alignment. Finally, the user would press against both assemblies until resistance can be felt giving way.

Now with reference to FIG. 1 and FIG. 3.1 and FIG. 3.2, the user would ensure that the spring loaded safety cover 20 is free of all packaging material. This would be accomplished by pressing the tip of a pen, pencil or other pointed object against the flush mounted safety cover release mechanism 22. Following this action, the user would be positioned to connect the ac adapter cord with integrated plug 54 into a wall socket and observe that the 9-element multi-colored LED instrument illumination strip 45 has one or more elements glowing.

Continuing with reference to FIG. 3.2, it is to be readily observed that one of a triad of lamps on the left-most side of the LED instrument illumination strip 45 would be lit, those being associated with the battery charge status. A depleted battery would return a red lamp illumination from the left-sided LED in that group. A normal operating level of charge would return an amber colored illumination from the center LED. A green lamp illumination from the right-sided LED would indicate a high-level status due to the fact that the voltage reference charge controller 37 would also be outputting a low level trickle charge to the 7.4V LiPo rechargeable battery 35.

Continuing further with reference to FIG. 1 and FIG. 3.2, the preparation for use operation would be allowed to proceed by powering up the hand held enclosure assembly 10. This would be accomplished by sliding the flush mounted on/off power switch 41 forward into the ON position, upon which additional lamp illumination sequences would be observed.

The first of these would involve the illumination lamp at the center-left of the LED instrument illumination strip 45 which would glow red. In the interest of operational safety the second of such would involve an interlock switch and associated functions supplied on the variable speed motor controller CCA 39 along with the illumination lamp at the center-right of the LED instrument illumination strip 45, which would glow amber in the case of an interlock fault condition. In order to clear this fault condition the user would be obligated to close the spring loaded safety cover 20 by manually pressing downward on the cover until a clicking engagement sound is produced, at which time the center-right amber colored LED illumination lamp would be extinguished.

Continuing with reference to FIG. 3.2, it is to be readily observed that one of a triad of lamps on the right-most side of the LED instrument illumination strip 45 would be lit, those being associated with the motor speed selection status. A slow speed selection would return an amber lamp illumination from the left-sided LED in that group. A normal operating speed selection would return a green colored illumination from the center LED. A fast speed selection would return a blue lamp illumination from the right-sided LED due to a likelihood that this had been either the previous or the original selected position on the flush mounted speed control switch 43, including associated functions supplied on the variable speed motor controller CCA 39.

Figure 4:
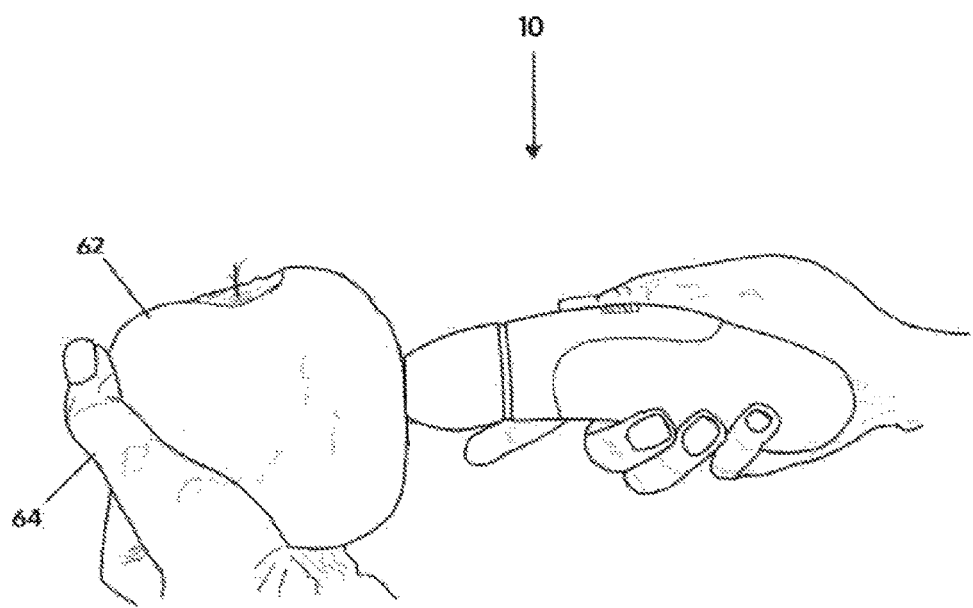
FIG. 4 is a perspective view of a hand held, battery powered fruit and vegetable peeling appliance of the present invention.

Referring now to the invention in more detail, in FIG. 1 and FIG. 3.2 and FIG. 4, there is shown a dc rechargeable, battery powered fruit and vegetable peeling appliance 02 contained within a hand held enclosure assembly 10 made ready to begin the peeling process with default settings and adjustments in place. The user would fit the device comfortably in either hand and with the thumb would slide the flush-mounted thumb operated on/off switch 41 to the forward position, an operation, causing the center-left LED on the multi-colored instrument illumination strip 45 to glow red and the outboard linear dc electric motor 12 to turn rapidly in a counter clockwise direction.

Figure 5:
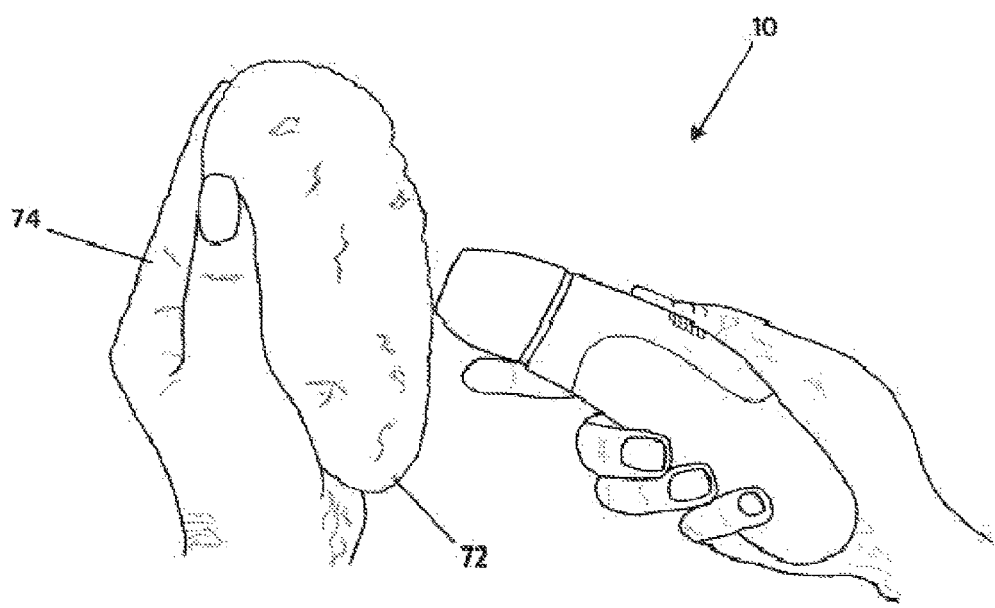
FIG. 5 is a perspective view of a hand held, battery powered fruit and vegetable peeling appliance of the present invention.

In more detail, now referring to FIG. 4 and FIG. 5, the user would likely feel most comfortable gripping a working item such as an apple 62 or a potato 72 in either hand 64/74, and then drawing said working item 62/72 toward the hand held enclosure assembly 10 at an angle of about 90 degrees while turning the item with the fingers evenly across said working item's surface. After a few moments it may be felt by the user that the cuts are not as deep as optimally required. Should this be the case the user may experiment by increasing the angle against the item to between 100 and 110 degrees while noting that a slightly greater angle tends to remove more of the inedible material.

In yet more detail, referring now to FIG. 5, it may be decided by the user that a larger, more thickly-skinned working item must be peeled. It would likely become apparent that the tougher covering would appear to offer greater resistance to the peeling process, and that a thickness setting on the appliance could be deemed desirable. Faced with this condition the user could be advised to return to the earlier angle position of said 100 degrees or more, and upon further experimentation find that adjusting the angle of attack fulfills the thickness setting as a virtual function without the need to change or adjust any of the default mechanical settings.

Referring to the invention in yet more detail, now with reference to FIG. 1 and FIG. 2 and FIG. 3.1 and FIG. 3.2, there is shown a dc rechargeable, battery powered fruit and vegetable peeling appliance 02 that with the hand held enclosure assembly 10 alone would reveal dimensions (max.) of 2¼" (l) 1¾" (w) 5⅞" (h). Dimensions when combined with the base unit charger assembly 50 would reveal (max.) 2¼" (l) 2⅜" (w) 6⅝" (h). The base unit charger assembly 50 alone would stand alone at a height of 2⅞". The floating head roller assembly 14 would reveal dimensions of ¹¹⁄₁₆" (dia) 1¹⁵⁄₁₆" (l). The outboard linear dc electric motor 12 (available) would reveal dimensions of 0.561" (dia) 0.236" (l). The ac adapter unit 52 (available); plus the ac adapter cord with integrated plug 54; (available) plus the 7.4V 900 mAh 15C LiPo rechargeable battery 35 (available); plus the TL431 band gap voltage reference charge controller CCA 37 (available); plus the LM741 op amp variable speed motor controller CCA 39 (available); all reveal dimensions that are proportional to the overall size of the top assembly as shown in FIGS. 3.1 and 3.2.

The advantages of the present invention include, without limitation, a hand held electrically operated device that is light in weight yet sufficiently powerful to peel through the thickest of vegetable skins, noting herein that this task is notoriously difficult in the case of winter squashes.

The advantages of the present invention also include, without limitation, the normal feel of a traditional tool in the hand by allowing the electrical device to be guided visually by the user and thereby eliminating the need to re-work the item with ordinary peelers and kitchen knives, noting herein that this remains a common drawback with stationary robotic arm electric peelers.

The advantages of the present invention also include, without limitation, the ability to remove fruit and vegetable skins in chip-wise fashion and thereby eliminate the incidental production of long strings of discard material, noting herein that such discard material has been known to choke the mechanisms of robotic electric peelers and remains a notable drawback with their use.

The advantages of the present invention also include, without limitation, the convenience of a lightweight, electrically operated and ergonomically friendly device that easily springs to the hand for seniors and in some cases handicapped individuals who may suffer from osteoarthritis of the knuckles and fingers, noting herein that extended periods of time spent while trying to maintain a tight grip on slender kitchen tools often leads to pain and discomfort in the arthritic hands of many.

The advantages of the present invention also include, without limitation, the use of a broad and contoured roller device in combination with true floating head design which allows the electrically powered appliance to maintain constant contact with the workpiece thereby rolling its way smoothly over the surface during and in between actual cuts, noting herein that flat drum designs lacking this floating head feature exhibit the common drawback of being unable to adapt to the irregular surfaces commonly seen in fruits and vegetables.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

The invention claimed is:

1. A peeling appliance comprising:
a base apparatus;
a hand-held apparatus;
the base apparatus and the hand-held apparatus being electrically connected with each other;
the base apparatus and the hand-held apparatus being configured to be fit with each other;
the hand-held apparatus having a horizontal axis of rotation;
the hand-held apparatus comprising a motor, a motor shaft, a floating roller device, a curvilinear cutting device, a first vertical sidewall, a second vertical sidewall, a first spring cage assembly and a second spring cage assembly;
the floating roller device being configured to receive an angular displacement impetus from the motor via the motor shaft so as to impart rotational force to the curvilinear cutting device;
the first spring cage assembly being inserted into the first vertical sidewall;
the second spring cage assembly being inserted into the second vertical sidewall;
the floating roller device comprising a roller housing, a four-wire shaft assembly, a first connector segment, a second connector segment, a first sleeve bearing and a second sleeve bearing;
the roller housing being located in between the first vertical sidewall and the second vertical sidewall;
the curvilinear cutting device being externally connected with the roller housing;
the four-wire shaft assembly being accommodated within the roller housing;
the four-wire shaft assembly being connected in between the first connector segment and the second connector segment;
the four-wire shaft assembly being configured to provide a torque transmission between the first connector segment and the second connector segment;
the first sleeve bearing and the second sleeve bearing being embedded into the roller housing;
the first connector segment penetrating the first sleeve bearing and the first spring cage assembly;
the second connector segment penetrating the second sleeve bearing and the second spring cage assembly; and
the first connector segment and the motor shaft being connected with each other.

2. The peeling appliance of claim 1 comprising:
a spring loaded safety cover;
a safety cover release mechanism; and
a roller assembly dust cover.

3. The peeling appliance of claim 1 comprising:
the base apparatus comprising an ac adapter unit, an ac adapter cord with integrated plug and an ac adapter integrated socket.

4. The peeling appliance of claim 1 comprising:
the hand-held apparatus comprising a 7.4V 900 mAh 15C LiPo rechargeable battery, a TL431 band gap voltage reference charge controller CCA, an LM741 op amp variable speed motor controller CCA, a flush mounted thumb-operated on-off switch, a flush mounted thumb-operated speed control switch and a 9-element LED multi-colored instrument illumination strip.

5. A method of removing a skin of a processing item by using the peeling appliance of claim 1, the method comprising:
grasping the processing item in a first hand;
grasping the hand-held apparatus in a second hand;
bringing the processing item and the hand-held apparatus together;
directing the hand-held apparatus to engage the skin of the processing item at varying degrees of elevation, thereby facilitating a manual control of a cutting depth and a cutting width due to an elliptical shape of the hand-held apparatus, the cutting depth ranging between 0.001" and 0.012".

* * * * *